(12) United States Patent
Haberman

(10) Patent No.: US 11,140,454 B2
(45) Date of Patent: Oct. 5, 2021

(54) SYSTEMS AND METHODS FOR CONTENT PRESENTATION MANAGEMENT

(71) Applicant: SourcePicture Inc., New York, NY (US)

(72) Inventor: Seth Haberman, New York, NY (US)

(73) Assignee: SOURCEPICTURE INC., New York, NY (US)

( * ) Notice: Subject to any disclaimer, the term of this patent is extended or adjusted under 35 U.S.C. 154(b) by 0 days.

(21) Appl. No.: 14/334,621

(22) Filed: Jul. 17, 2014

(65) Prior Publication Data

US 2017/0006351 A1    Jan. 5, 2017

Related U.S. Application Data

(60) Provisional application No. 61/847,204, filed on Jul. 17, 2013.

(51) Int. Cl.
*H04N 21/6332* (2011.01)
*H04N 21/482* (2011.01)
(Continued)

(52) U.S. Cl.
CPC ..... *H04N 21/6332* (2013.01); *H04N 21/2358* (2013.01); *H04N 21/4126* (2013.01);
(Continued)

(58) Field of Classification Search
CPC ............ H04N 21/4182; H04N 21/258; H04N 21/25891; H04N 21/4532; H04N 21/6332;
(Continued)

(56) References Cited

U.S. PATENT DOCUMENTS 7,140,033 B1    11/2006   Durden et al.
2003/0007001 A1  1/2003   Zimmerman
(Continued)

FOREIGN PATENT DOCUMENTS

EP    1860807 A2    11/2007
EP    2003801 A2    12/2008
(Continued)

OTHER PUBLICATIONS

International Search Report and Written Opinion of the International Searching Authority, dated Nov. 6, 2014, from counterpart International Application No. PCT/US2014/047101, International Filing Date Jul. 17, 2014.
(Continued)

*Primary Examiner* — Alexander Gee
(74) *Attorney, Agent, or Firm* — Seyfarth Shaw LLP; George Haight

(57) ABSTRACT

Methods, systems, and computer-readable media for managing presentation settings of a content presentation device are generally described. Presentation settings may include settings specifying the presentation of content, such as contrast or brightness for video content presented through a video display device. Provider presentation settings may be specified by a content provider, third party, or the like for a content asset, such as a movie or video game. The provider presentation settings may be transmitted or otherwise made available to the content presentation device and/or content consumer. For example, the provider presentation settings may be encoded within a content stream and sent to a content presentation device along with the content. The provider presentation settings may be configured to adjust the device presentation settings of a content presentation device.

26 Claims, 6 Drawing Sheets

(51) Int. Cl.
  *H04N 21/235* (2011.01)
  *H04N 21/6547* (2011.01)
  *H04N 21/41* (2011.01)
  *H04N 21/435* (2011.01)
  *H04N 21/485* (2011.01)
  *H04N 21/44* (2011.01)
  *H04N 21/422* (2011.01)
  *H04N 21/234* (2011.01)

(52) U.S. Cl.
  CPC ......... *H04N 21/435* (2013.01); *H04N 21/482* (2013.01); *H04N 21/485* (2013.01); *H04N 21/4852* (2013.01); *H04N 21/4854* (2013.01); *H04N 21/6547* (2013.01); *H04N 21/23418* (2013.01); *H04N 21/42202* (2013.01); *H04N 21/44008* (2013.01)

(58) Field of Classification Search
  CPC ............ H04N 21/4126; H04N 21/435; H04N 21/485; H04N 21/4852; H04N 21/4854; H04N 21/4394; H04N 21/44008; H04N 21/233; H04N 21/23418
  See application file for complete search history.

(56) References Cited

U.S. PATENT DOCUMENTS

| | | | |
|---|---|---|---|
| 2005/0015802 A1 | 1/2005 | Jean-Michel | |
| 2005/0038875 A1* | 2/2005 | Park | H04L 67/02 709/219 |
| 2005/0229204 A1 | 10/2005 | Kalker | |
| 2006/0012586 A1 | 1/2006 | Ochs et al. | |
| 2006/0015911 A1 | 1/2006 | Dean | |
| 2006/0280127 A1* | 12/2006 | Mizuno | H04L 12/2834 370/254 |
| 2007/0061841 A1* | 3/2007 | Bae | H04H 20/28 725/46 |
| 2009/0219442 A1 | 9/2009 | Hironaka et al. | |
| 2010/0013996 A1* | 1/2010 | Kang | H04N 5/445 348/553 |
| 2010/0222000 A1* | 9/2010 | Sauer | G06F 9/451 455/41.2 |
| 2010/0271390 A1* | 10/2010 | Tran | G09G 5/00 345/619 |
| 2011/0080522 A1* | 4/2011 | Hardacker | H04N 21/435 348/576 |
| 2011/0299859 A1* | 12/2011 | Lee | G03G 15/502 399/8 |
| 2012/0311046 A1* | 12/2012 | Grigoriev | H04L 45/308 709/206 |
| 2013/0007236 A1* | 1/2013 | Besehanic | H04N 21/25891 709/223 |
| 2013/0107122 A1* | 5/2013 | Ha | H04N 21/4131 348/563 |
| 2013/0107783 A1* | 5/2013 | Shaw | H04W 4/06 370/312 |
| 2013/0198329 A1* | 8/2013 | Wang | H04L 65/00 709/217 |
| 2013/0258191 A1* | 10/2013 | Eyer | H04N 21/8352 348/468 |
| 2013/0314302 A1* | 11/2013 | Jeung | G06F 3/1423 345/2.3 |
| 2014/0211666 A1* | 7/2014 | Gillett | H04N 21/485 370/259 |
| 2014/0298200 A1* | 10/2014 | Cierniak | H04L 65/4015 715/753 |
| 2015/0016661 A1* | 1/2015 | Lord | H04N 21/2668 382/100 |
| 2019/0182297 A1* | 6/2019 | Montalto | H04L 65/4069 |

FOREIGN PATENT DOCUMENTS

| | | |
|---|---|---|
| EP | 2106139 A2 | 9/2009 |
| EP | 2611165 A1 | 7/2013 |
| JP | 2010-147813 A | 7/2010 |

OTHER PUBLICATIONS

International Preliminary Report on Patentability, dated Jan. 28, 2016, from counterpart International Application PCT/US2014/047101, International Filing Date Jul. 17, 2014.

Extended European Search Report and European Search Opinion, dated Feb. 16, 2017, from corresponding European Patent Application No. 14826717.2.

* cited by examiner

SYSTEMS AND METHODS FOR CONTENT PRESENTATION MANAGEMENT

CROSS REFERENCE TO RELATED APPLICATIONS

This application claims the benefit of U.S. Provisional Application No. 61/847,204 filed on Jul. 17, 2013, the contents of which are incorporated by reference in their entirety as if fully set forth herein.

FIELD OF INVENTION

The described technology generally relates to the presentation of content through a content presentation device, and, more specifically, to managing and/or providing information relating to presentation settings of the content presentation device based on information associated with the content.

BACKGROUND

Advances in digital display and audio technology have improved the user experience of television and digital content consumers. For example, television and computing device manufacturers provide myriad visual and audio settings, special effects and other device capabilities for a user to experience a customized, personalized experience. Digital televisions and other display devices often include pre-defined modes in which several display and/or audio settings (e.g., contrast, brightness, edge detection, dynamic color range, bass, treble, etc.) are customized for a particular viewing experience. Illustrative pre-defined modes include "sports," "movies," "vivid," "game mode." Selection of such pre-defined modes may apply a distinct configuration of the device's display settings to enhance certain features important to the type of content being viewed.

A viewer may select settings or pre-defined mode through a sequence of menu browsing and selection functions. However, viewers often neglect to take advantage of these settings and modes because, for instance, they do not recall the settings and modes, navigation and selection are too time consuming or confusing, or the viewer prefers not to change settings or select a new mode for each type of program (e.g., a viewer switching between a sporting event and a movie). For a viewer to properly take advantage of the settings and pre-defined modes, the viewer would need to perform tedious menu browsing and selection functions every time the viewer changed channels or selected a new program to watch. This inconvenience often causes viewers to maintain their display settings in the same configuration regardless of the chosen program, ultimately failing to provide the enhanced viewing experience for which the display is capable of presenting.

The different number of viewing devices available to a consumer also provides another hindrance in fully optimizing the presentation settings of media content. With the proliferation of television-ready personal computers, Internet content providers, and sophisticated smart-phones and tablet devices, the number and presentation capabilities of viewing devices further complicates the ability to optimally enhance the presentation of media content. For example, a 52-inch LED television set may provide a vastly different viewing experience than the 5-inch display of a smartphone device. In addition, the audio and visual capabilities of each device and the networks over which the content may be transmitted differ greatly. As such, a user may experience very different viewing experiences depending on the particular device that is presenting the content as well as the source of the content.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a content presentation management system may include a processor and a non-transitory, computer-readable storage medium in operable communication with the processor. The computer-readable storage medium may contain one or more programming instructions that, when executed, cause the processor to generate presentation information associated with a content asset based on at least one provider presentation setting configured for the content asset, the presentation information being configured to implement the adjustment of at least one device presentation setting of a content presentation device configured to present the content asset, and provide access to the presentation information to the content presentation device in relation to the content asset.

In an embodiment, a computer-implemented method for managing the presentation of a content asset through a content presentation device may include, by a processor generating presentation information associated with the content asset based on at least one provider presentation setting configured for the content asset, the presentation information being configured to implement the adjustment of at least one device presentation setting of the content presentation device configured to present the content asset, and provide access to the presentation information to the content presentation device in relation to the content asset.

In an embodiment, a content presentation device may include a presentation component configured to present a content asset according to at least one device presentation setting, a receiver configured to receive the content asset, and a processor, in operable communication with the presentation component, configured to receive decoded presentation information associated with the content asset, the presentation information being configured based on at least one provider presentation setting to implement the adjustment of the at least one device presentation setting to facilitate a presentation of the content asset via the presentation component according to the at least one device presentation setting.

In an embodiment, a method for enhancing the display of media content may include providing a piece of media content (e.g., a content asset), defining presentation settings for the piece of media, encoding the piece of media content with the presentation settings into a media package, and transmitting over a network the media package with instructions to reconfigure a display according to the presentation settings.

In an embodiment, a method of enhancing the display of media content may include receiving a piece of media content over a network, the media content comprising presentation settings, decoding the media content, and configuring a display device according to the presentation settings.

In an embodiment, a system for enhancing the display of media content may include a receiver configured to receive a piece of media content, a decoder configured to decode presentation settings from the piece of media content, and a display configured to adjust the display according to the presentation settings. In an aspect, the presentation settings may include at least one of treble, bass, contrast, brightness, sharpness.

BRIEF DESCRIPTION OF THE DRAWINGS

The above and other objects of the present invention will become more readily apparent from the following detailed description taken in connection with the accompanying drawings.

DETAILED DESCRIPTION

Figure 1:
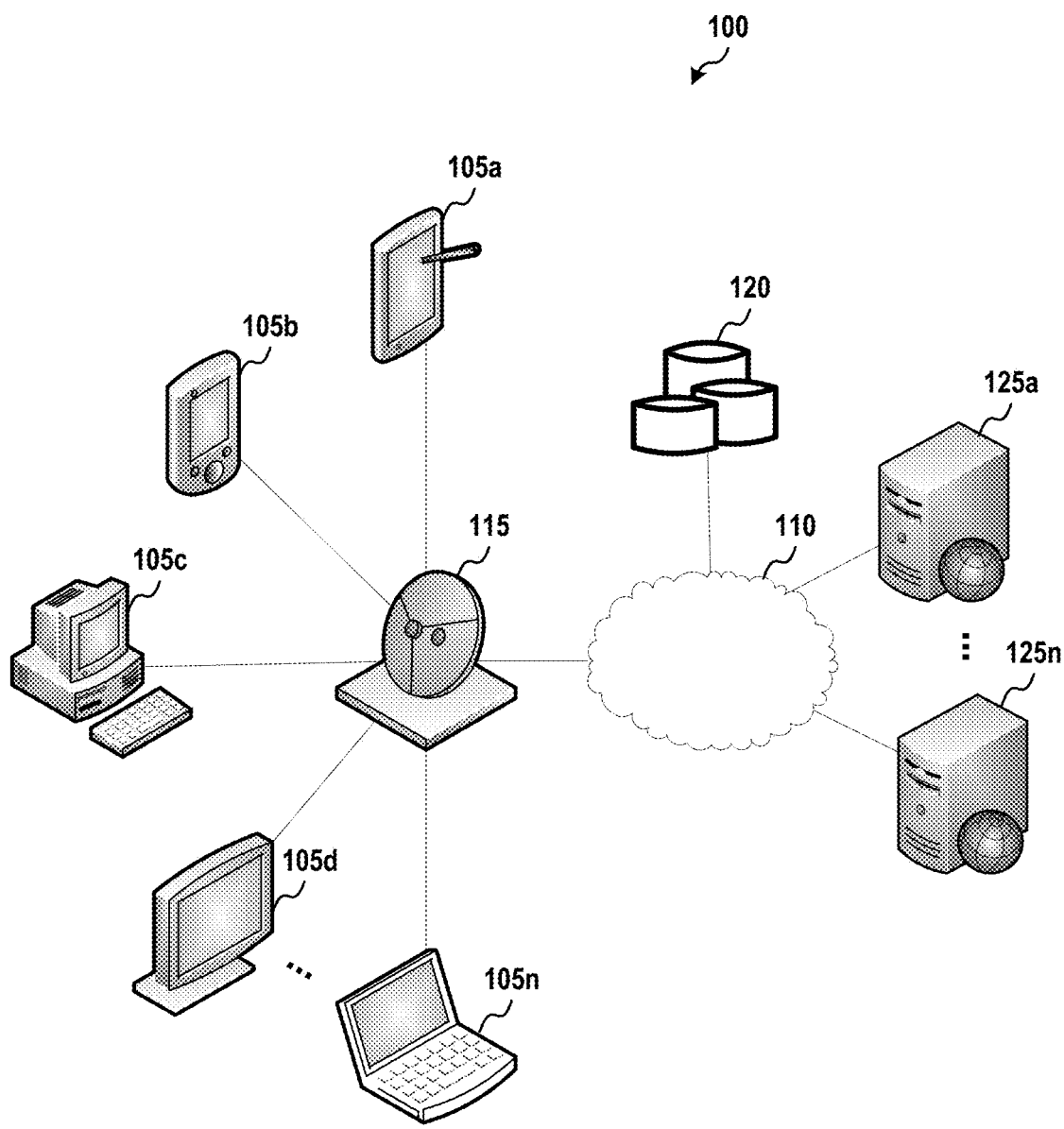
FIG. 1 depicts a content presentation network according to some embodiments.

The described technology generally relates to systems and methods for managing presentation settings associated with presenting content through a content presentation device. Content (or a "content asset") may generally include any type of data, information, media, or the like that may be expressed through a medium. Illustrative mediums may include audio and visual mediums such as television, radio, and broadcast, cable, satellite, and/or network (e.g., Internet) forms thereof. Examples of content may include, but are not limited to, video, audio, movies, video games, television and radio programs, commercials, websites, images, photographs, text, electronic or digital documents, haptic or tactile sensations, information feeds, streaming media, and/or combinations thereof.

A content presentation device is generally any device now known to those having ordinary skill in the art or developed in the future that is capable of presenting content to a viewer or other type of content consumer. Non-limiting examples of content presentation devices include televisions, smart televisions, laptops, personal digital assistants (PDAs), table computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top-boxes, satellite receivers, video-on-demand (VOD) receivers, content receivers (e.g., Apple TV® manufactured by Apple Inc. of Cupertino, Calif., United States; Roku® manufactured by Roku, Inc. of Saratoga, Calif., United States), digital video recorders (DVRs), personal video recorders (PVRs), hard drives, flash drives, storage servers, digital video disc (DVD) devices, Blu-Ray™ devices, or the like.

A presentation setting generally includes any type of setting or mode capable of configuring how a content presentation devices presents content. For instance, a television may have presentation settings for configuring the brightness and contrast of the display presenting the content. In another instance, an audio device may have presentation settings for configuring the bass and treble of sound emitted by the audio device. In some embodiments, the presentation settings may be converted, formatted, structured, translated, or otherwise arranged into presentation information configured to program, instruct, control, or otherwise manage the presentation settings of a content presentation device. For example, presentation information may be configured to instruct the operating system, software, and/or hardware of a content presentation device to change the presentation settings to those specified in the presentation information.

In some embodiments, the content may be associated with one or more presentation settings ("provider presentation settings"). In some embodiments, the content may be associated with enhanced and/or optimized presentation settings configured for the content and/or a content presentation device. In some embodiments, the presentation settings may be delivered and/or made otherwise accessible to the presentation device in association with the content. For instance, the presentation settings may be transmitted (e.g., in the form of presentation information) along with the content. In another instance, the presentation settings may be accessible along with the content, such as through an interface for selecting content, including, without limitation, a program guide, an electronic program guide, an electronic program guide application or mobile computing device application ("mobile app" or "app") (e.g., NextGuide™ of Digit Media, Inc. of San Francisco, Calif., United States), a content presentation application (NetFlix® of Los Gatos, Calif., United States; Hulu™ of Santa Monica, Calif., United States), and/or combinations thereof. For example, data transmitted to a receiver device detailing program information may also include data for which the viewer's display device may recognize, read and configure the display settings once the viewer selects the program to be viewed.

As used herein, "provider presentation settings" may generally refer to presentation settings for a content asset configured externally to a content presentation device. For instance, provider presentation settings may be configured by a content creator, service provider, device manufacturer, third party, external software application, etc. before or during transmission of content to a content presentation device. As used herein, "device presentation settings" may generally refer to the presentation settings as configured on an actual content presentation device. For example, for a television content presentation device, the device content presentation settings may include contrast=X, sharpness=Y, etc.

In some embodiments, a transport stream carrying a piece of content over a network may include a portion which defines the optimal presentation settings for the content. The content presentation device (e.g., display) may include appropriate circuitry or other software and/or hardware to recognize and read the presentation setting portion (e.g., the presentation information) and to automatically and dynamically configure the content presentation device according to those settings.

In some embodiments, a viewer or other content consumer may directly retrieve or "look-up" the presentation settings, for example, via a broadcast network or other network, such as the Internet. In such an embodiment, the viewer may initiate a request for the display, or associated receiver device, to poll a server or other network component for the optimal presentation settings. The server may transmit the settings to the display, a receiver device or other device capable or recognizing and configuring the settings of the device.

In some embodiments, enhanced viewing capabilities as described herein may be offered as a premium service to subscribers or consumers who opt to pay an additional fee to provide the enhanced systems provided in this description.

Although certain examples and embodiments described herein may detail the use of broadcast cable or satellite transmissions, one skilled in the art would recognize that other delivery networks could be used, including, without limitation, the Internet, closed circuit networks, local and wide area networks, without deviating from the scope of the embodiments described herein.

FIG. 1 depicts a content presentation network according to some embodiments. As shown in FIG. 1, a content presentation system 100 may include content providers 125a-n configured to provide content to a service provider 115. A content provider 125a-n may include any type of content provider known to those having ordinary skill in the art, such as a television studio or broadcast network, a radio channel, a website provider, a VOD service, a content storage and delivery service, or the like. A service provider 115 may access content from the content providers 125a-n over a network, such as a cable or satellite network or a communications network, such as the Internet. The service provider 115 may include any type entity or structure capable of providing content to a content presentation device 105a-n. For instance, the service provider 115 may include a television broadcast network, a cable television network, a satellite television network, an internet service provider (ISP), a computing device advertising network, a media distribution network, a cloud computing network, a local area network (LAN), a wide area network (WAN), a terrestrial network, a mobile network, and/or any combination thereof. The content presentation devices 105a-n may include any type of device capable of receiving and/or presenting content to a viewer or other content consumer. Non-limiting examples of content presentation devices include televisions, smart televisions, laptops, PDAs, table computing devices, smartphones, PCs, display monitors or terminals, radios, audio devices, speakers, headphones, haptic devices, electronic reading devices, LED devices, OLED devices, wearable screens, set-top-boxes, satellite receivers, VOD receivers, content receivers In some embodiments, the service provider 115 may include a network for transmitting content directly from the content provider 125a-n to the content presentation devices 105a-n. For instance, the service provider 115 may include a network and associated technology for a television production studio to provide content directly to content presentation devices 105a-n. In another instance, the service provider 115 may include a content access application and associated hardware and software for allowing a user to access content from various content providers 125a-n. Illustrative content access applications include Netflix® and Hulu®. In some embodiments, the content providers 125a-n may communicate directly with the content presentation devices 105a-n, for example, through the network 110.

The content presentation system 100 may include and/or have access to one or more data stores 120. The data stores 120 may be configured to store content and or information that may be used by the content presentation devices 105a-n, service providers 115, and/or content providers 125a-n for the creation, transmission, and/or presentation of the content. In some embodiments, the data stores 120 may at least partially include data from third parties. For instance, the data stores 120 may include information associated with the number and types of content presentation devices 105a-n receiving content through the service provider 115 and/or the network 110, content presentation device 105a-n presentation settings, content presentation device 105a-n operating systems, software, firmware, and/or hardware, viewer or other content consumer and/or consumer device profiles (including preferences, such as content presentation preferences), content creator presentation settings or recommendations relating thereto (e.g., the recommended presentation settings as specified by the studio that created the content, etc.), information and/or applications for translating presentation settings into presentation information capable of changing the presentation settings of a particular content presentation device 105a-n.

Figure 2:
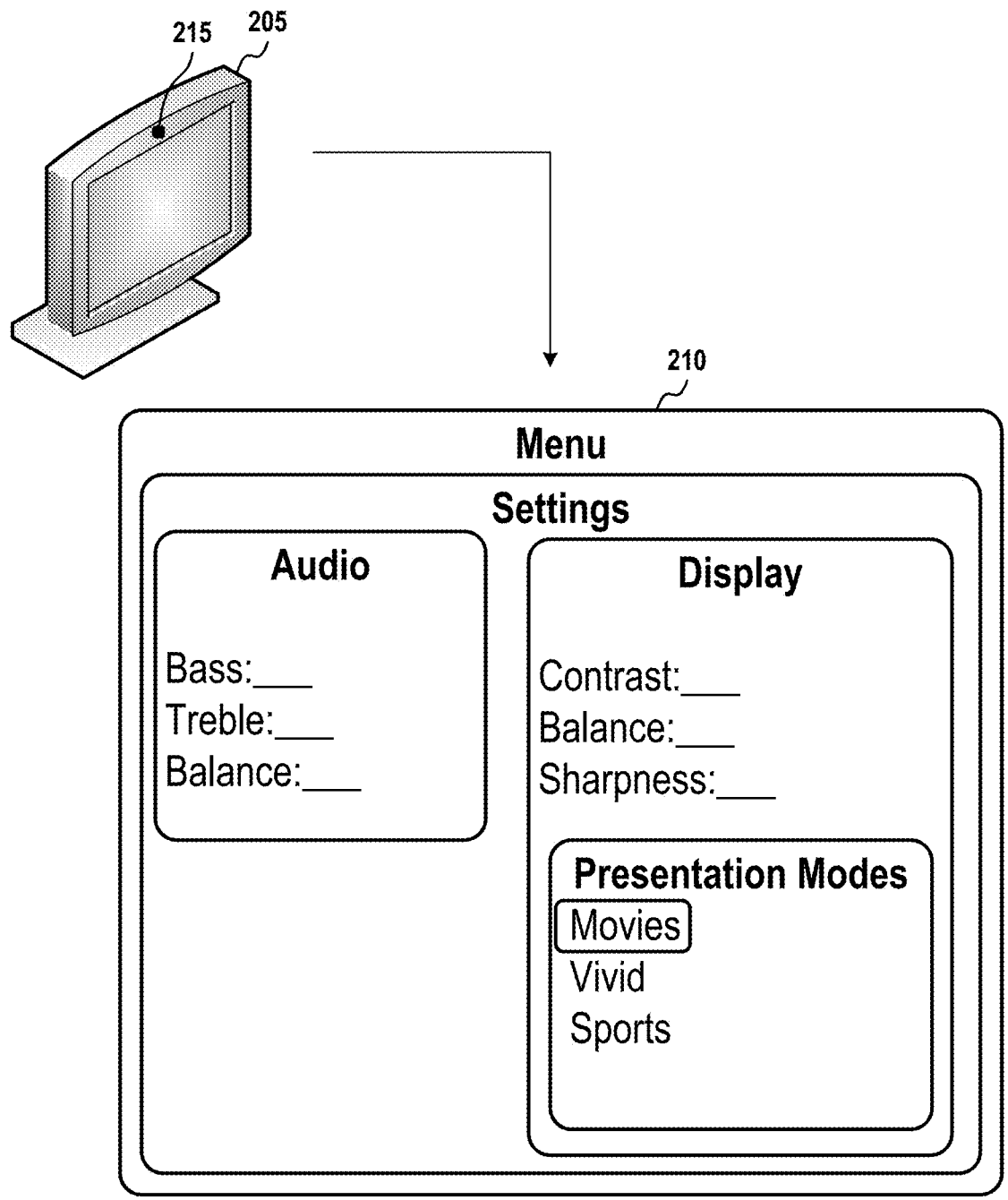
FIG. 2 depicts presentation settings for an illustrative content presentation device according to some embodiments.

FIG. 2 depicts presentation settings for an illustrative content presentation device according to some embodiments. As shown in FIG. 2, a content presentation device 205 may have various presentation settings 210 (device presentation settings) configured to specify how the content presentation device 205 may present content to a viewer or other content consumer. The presentation settings 210 may be implemented in hardware and/or software to control the content presentation elements and/or hardware to present content according to the presentation settings. Conventional technology may allow a user to access the presentation settings 210 through a menu system. In some embodiments, the presentation settings 210 may be accessed and/or changed through software and/or hardware instructions. In some embodiments, the presentation settings 210 of a content presentation device 205 may be modified by a separate device, such as a computing device (e.g., smartphone, tablet computing device, etc.)

The presentation settings 210 may include any type of setting capable of specifying the presentation of content through the content presentation device 205. The presentation settings 210 may be configured based on the type of content presentation device 205 and/or content presentation elements, hardware, and/or software associated therewith. For a visual display content presentation device 205 (e.g., any type of content presentation device 205 configured to present visual content through a screen), illustrative settings may include, without limitation, brightness, contrast, sharpness, color settings (red, green, blue (RGB)), dynamic color range. For a content presentation device 205 capable of presenting audio content, illustrative settings may include, without limitation, volume, treble, bass, fade, balance. In some embodiments, the presentation settings 210 may include presentation modes that include pre-configured generally directed toward specific types of content, such as sports or movies, or presentation features, such as vivid, soft, or dark. For example, a "Sports" setting made adjust certain audio/visual characteristics of the display to further enhance the presentation of a sporting event. The nature of live sporting events calls for enhanced brightness and greater contrast to present a clearer picture of the displayed motion. In another example, a "Movie" setting may decrease the sharpness and brightness of the display to provide a more cinematic presentation similar to the presentation in a movie theater.

Many of these preset modes, however, often go unused due to the inconvenience to the viewer of switching back and forth between settings and the time consuming nature of the operations. For example, to switch presentation modes a viewer may have to progress through several menus and other procedures to locate and select the desired mode. Additionally, if the viewer wants to change channels or surf through the available programming content, to fully maximize the viewing experience the viewer must re-configure, or apply a new preset mode, with every channel he decides to watch.

In some embodiments, a sensor 215 may be used to detect certain ambient light and sound characteristics which can be used to further configure the presentation settings 210 alone or in combination with presentation information and/or provider presentation settings (e.g., sensor 215 information may supplant and/or augment presentation information and/or provider presentation settings). In some embodiments, the sensor 215 may be operatively coupled to the content presentation device 205 (e.g., operatively coupled to a processor or other hardware of the content presentation device 205). In some embodiments, the sensor 215 may not be operatively coupled to the content presentation device 205. In some embodiments, the sensor 215 may be in communication with at least a portion of the content presentation system 100, such as another content presentation device 105a-n (e.g., a computing device in communication with a television), the service provider 115, the network 110, a content provider 125a-n, or any combination thereof. In this manner, the information obtained by the sensor 215 may be used to specify the presentation settings 210 according to some embodiments.

The sensor 215 may include any type of sensor capable of measuring or otherwise obtaining information that may relate to the presentation settings 210 and/or the optimization or configuration thereof. Non-limiting examples of sensors 215 may include a photo sensor, a light sensor, a decibel, a temperature sensor, and a motion sensor. In some embodiments, data from the sensor 215 may be used to adapt or further adapt the presentation settings 210 to ensure a quality display. For example, if the sensor 215 detects a high amount of ambient light, the presentation settings 210 may be altered to increase the brightness of the display of a content presentation device 205 to provide for a better viewing. In another example, if the sensor 215 detects that the room is dark, the brightness of the display of a content presentation device 205 may be decreased to reduce eyestrain or to otherwise optimize the presentation of content.

In some embodiments, content may be encoded to include the provider presentation settings and/or presentation information relating thereto for the particular piece of content (e.g., forming a "media package"). For instance, a content provider 125a-n or other content creator may determine provider presentation settings for content, for example, to optimize the user experience of consuming the content. The provider presentation settings may be formatted, translated, or otherwise changed into presentation information that may be handled by the various devices that may transmit, receive, or otherwise access the presentation information. For example, the provider presentation settings for a particular piece of content may be translated into presentation information that may be read by a particular content presentation device or the operating system, hardware, and/or software thereof to actually cause a change in the presentation settings. For instance, a television program for a sporting event may be transmitted with presentation information instruction the destination television to switch to a "Sports" display mode when tuned to the television program. In another instance, a VOD movie may be downloaded to a computing device (or television, smart television, etc.) with presentation information instructing the computing device to set the brightness to a certain value and/or range of values when playing the movie. The computing device (or television, smart television, etc.) may revert back to original settings when not watching the movie or if another event occurs (e.g., decreasing the brightness level if a "low battery" event occurs, increasing the brightness if a sensor detects a low light environment, etc.).

As used herein, the provider presentation settings may be, include, and/or take the form of presentation information. Accordingly, description herein involving transmitting, receiving, configuring, setting, determining, specifying, or otherwise associating with provider presentation settings may include the presentation information associated therewith. For instance, transmitting provider presentation settings may include transmitting provider presentation settings, presentation information, and/or provider presentation settings and presentation information.

In some embodiment provider presentation settings may be transmitted over a broadcast network or the Internet (e.g., through service provider 115 and/or network 110) to a content presentation device 205 to change the presentation settings of the content presentation device 205. In one non-limiting example, a portion of a content stream may include a data package detailing certain audio/visual display settings (i.e., the provider presentation settings) specifically tailored to the particular content being streamed. In some embodiments, a content package may be downloaded to or otherwise accessed by a content presentation device 205, including a similar data package with the tailored audio/visual settings (i.e., the presentation settings 210).

Figure 3:
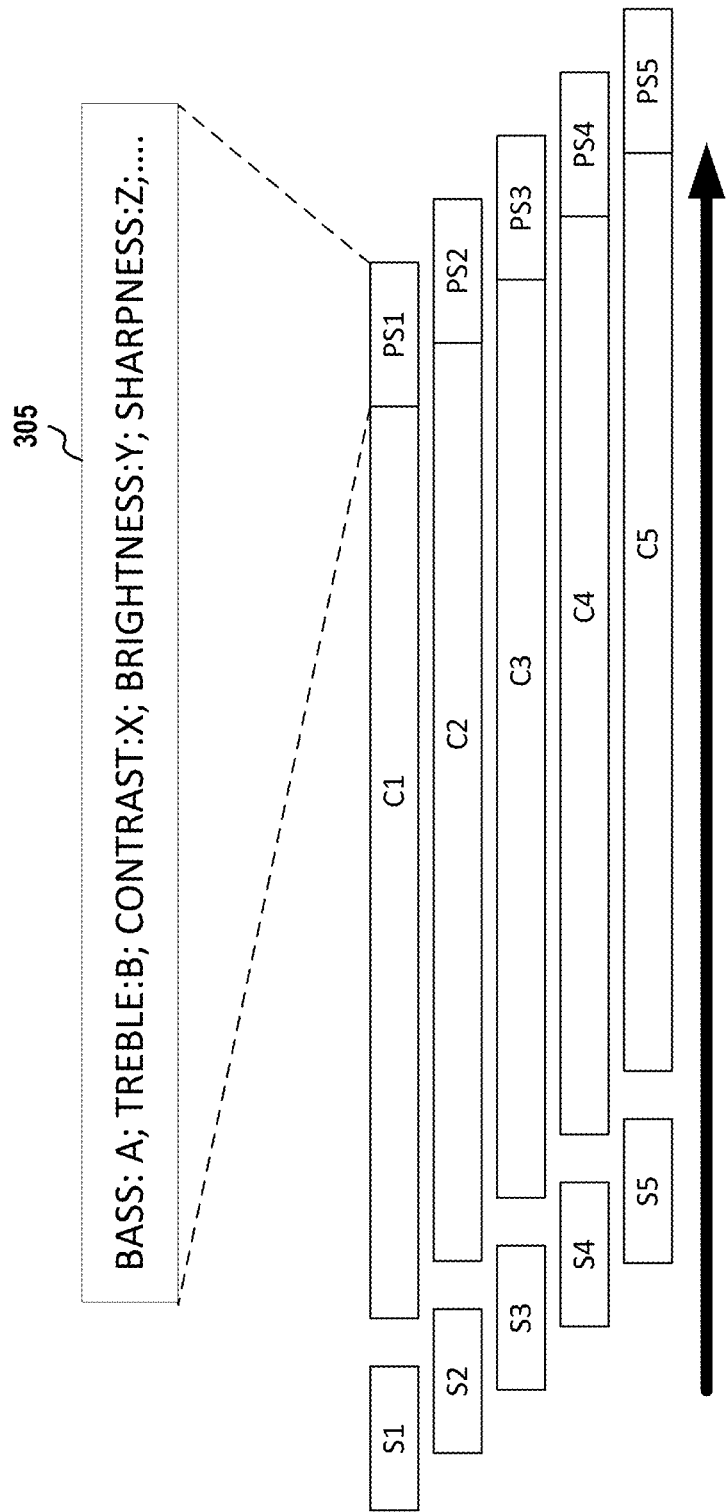
FIG. 3 depicts an illustrative content delivery configuration providing presentation settings.

FIG. 3 depicts an illustrative content delivery configuration providing presentation settings. As shown in FIG. 3, a plurality of content streams or channels S1-S5 ("content streams") may be transmitted to a content presentation device (not shown), such as content presentation devices 105a-n and/or content presentation device 205. The content streams S1-S5 may include content packages C1-C5 configured to provide content to a content presentation device. The content packages C1-C5 may include and/or may be associated with presentation settings PS1-PS5 (e.g., to form "media packages").

In some embodiments, the presentation settings PS1-PS5 (provider presentation settings) may include various settings and values therefor for specifying the presentation settings 210 of a destination content presentation device 205. In some embodiments, the presentation settings PS1-PS5 may include information for implementing the presentation settings 210 on one or more particular types of content presentation devices 205. For example, the presentation settings PS1-PS5 may include information for different types of televisions, such as different presentation settings and/or software and/or hardware instructions for different brands, models, resolutions, scaling, aspect ratio, high definition characteristics (e.g., high definition (HD), ultra-high definition (UHD), standard definition, and variations thereof), and sizes of televisions. For example, media content recorded and created for 4K resolution may also include presentation settings for scaling such content to a lower resolution. In another example, the presentation settings PS1-PS5 may include information for different types of devices, such as different presentation settings and/or software and/or hardware instructions for a television, a tablet computing device, a smartphone, etc. for the same content package C1-C5. In this manner, a content package C1-C5 may be transmitted to a plurality of content presentation devices and may include the presentation settings PS1-PS5 for configuring the different types of presentation devices in one set of presentation settings PS1-PS5.

In some embodiments, the presentation settings PS1-PS5 for a content package C1-C5 may be specific for a particular type or class of presentation device (e.g., televisions, Sony® televisions, tablet computing devices, iPads® manufactured by Apple of Cupertino, Calif., United States, etc.). In such embodiments, the content packages C1-C5 may be sent to the corresponding content presentation devices. For instance, a first content package C1 may have presentation settings PS1 for a particular television, while a second content package C1' may include the same content as content package C1, but may include a different set of presentation settings PS1' for a different type of television or a different type of device (e.g., a tablet computing device).

Figure 4:
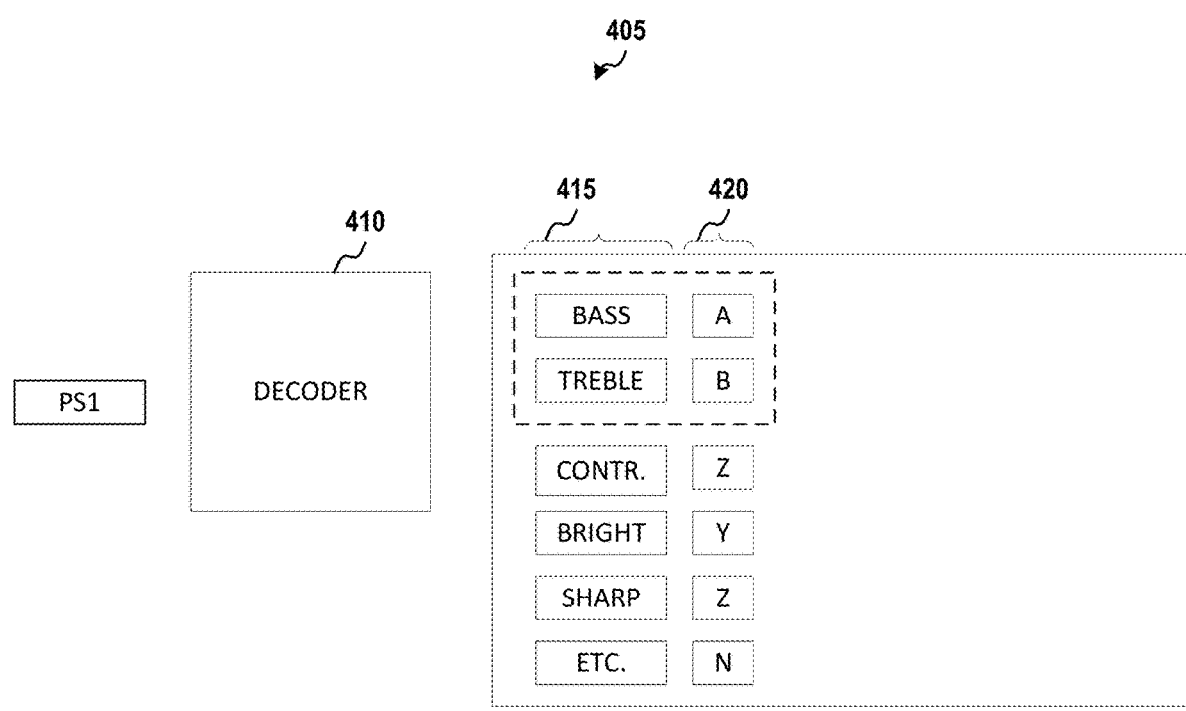
FIG. 4 depicts an illustrative content presentation device according to some embodiments.

FIG. 4 depicts an illustrative content presentation device according to some embodiments. As shown in FIG. 4, presentation settings PS1 may be received by a content presentation device 405. The presentation device may have a decoder 410 configured to decode the presentation settings PS1 received by the presentation device 405 (e.g., through a receiver, tuner, communication port, or the like). The decoder 410 may be implemented in hardware, software, or a combination thereof. In some embodiments, the decoder 410 may be a native or integral software application and/or hardware element of the content presentation device 405. In some embodiments, the decoder 410 may include a third-party hardware and/or software element. For example, the decoder 410 may include a software application configured to operate on the content presentation device 405 and/or a computing device in operable communication with the content presentation device 405 (e.g., a tablet computing device in communication with a television or set-top-box). In another example, the decoder 410 may include a hardware device (e.g., a dongle or drive) configured to connect to the content presentation device through a communication element (e.g., a universal serial bus (USB) port, an HDMI port, an Ethernet port, a wireless (WiFi) communication element, etc.). In some embodiments, the settings may be transmitted and implemented via visual indicators, such as device readable or scannable bar codes, quick response (QR) codes, or through Bluetooth®, near field communication (NFC), or other communication protocols.

The decoder 410 may be configured to recognize, read and reconfigure the presentation settings 415 of the content presentation device based on the data included in the presentation settings PS1. For example, when the package C1 is chosen by a viewer, such as through a tuning operation on a cable or satellite box, or selected by the user via a browser or on-demand service, the decoder 410 is configured to recognize the existence of PS1, read the various data settings contained in the package, and cause the display to automatically configure the audio/visual settings listed in PS1 to the defined values 420. In some embodiments, such a configuration operation may occur automatically and may be "invisible" to the viewer. In some embodiments, the content presentation system may provide an informative message to indicate to the viewer that certain settings have been applied (and may require an affirmative selection, an automatic selection after a predetermined time period, etc.)

In some embodiments, the presentation settings PS1-PS5, may be defined by the content creators or editors when the content is prepared for dissemination to service providers 115, networks 110, or directly to content presentation devices 405. As such, the settings defined in the presentation settings PS1-PS5 may be well-defined and chosen by professionals for determining the optimal settings in which to consume the given content. In some embodiments, the presentation settings PS1-PS5 may be determined and/or modified based on a sensor 215 configured to detect user or environmental conditions associated with the content presentation device 405. In some embodiments, the presentation settings PS1-PS5 may be determined and/or modified based on a user profile and/or user preferences associated with a viewer and/or a content presentation device. In some embodiments, the presentation settings PS1-PS5 may be determined and/or modified based on third party users, such as preferred and/or suggested settings obtained through Internet services (e.g., websites, social network services, blogs, etc.).

In some embodiments, user settings for a content asset may be transmitted to an entity or application configured to generate provider presentation settings in order to allow the entity and/or application to learn user presentation settings for a content asset for the generation of future provider presentation settings for use with the same content asset or other content assets.

As described above, audio settings may also be configured via the presentation settings PS1-PS5. In an embodiment where the audio capabilities are internal to the content presentation device 405, such as devices with internal speakers, etc., the audio characteristics may be configured via the presentation device 405 itself. In an embodiment in which the content presentation device 405 include external audio capabilities, such as an external home theater receiver, the external home theater receiver may also include a similar decoder to recognize, read and reconfigure the external speakers based on the data from the presentation settings PS1-PS5 and/or the content presentation device 405 may be configured to communicate with the external audio capabilities to specify the presentation settings PS1-PS5 thereof.

Figure 5:
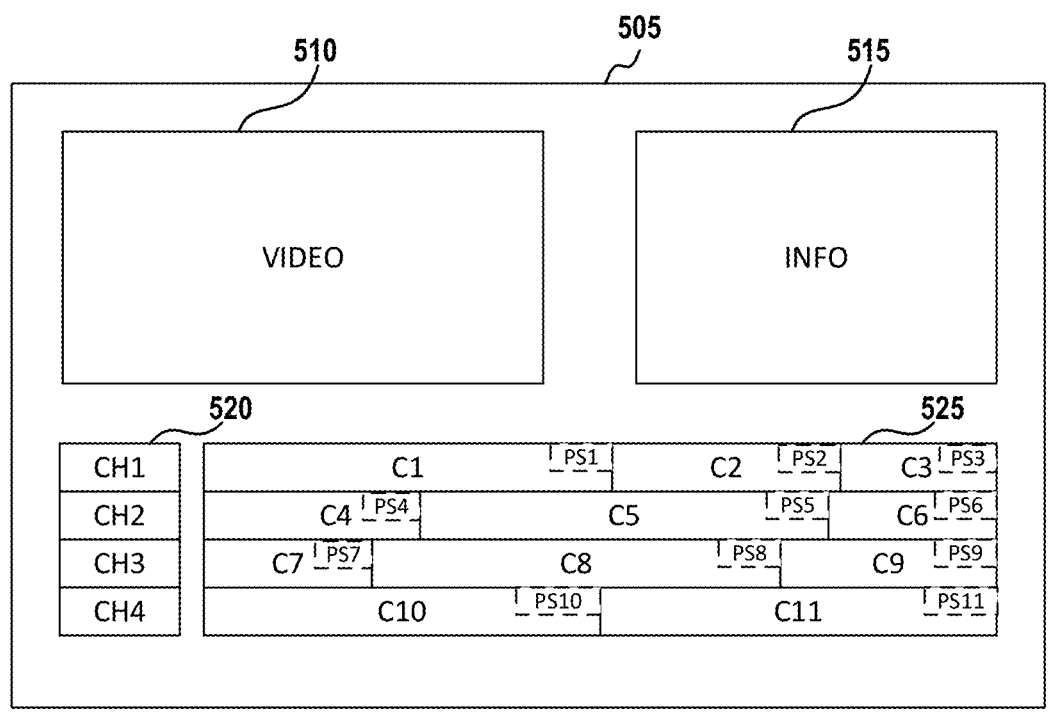
FIG. 5 depicts a programming guide for providing presentation settings according to some embodiments.

FIG. 5 depicts a programming guide for providing presentation settings according to some embodiments. As shown in FIG. 5, a programming guide 505 (e.g., an electronic programming guide (EPG)) may be configured to provide presentation settings PS1-PS11 to a user accessing the EPG 505 through a content presentation device and/or a device in communication with a content presentation device (e.g., the EPG 505 is accessed through a tablet computing device operably coupled to a television). The EPG 505 may include a channel list 520 and associated content listing 525 for each channel. The channel list 520 may include content from multiple content sources, such as broadcast channels (including past and future broadcast content), VODs, DVRs, PVRs, computing devices (e.g., content stored on computing devices), and multiple content providers (e.g., multiple VOD sources, Netflix®, Hulu™, etc.). The EPG 505 may be configured to present visual content 510 (e.g., images, videos, trailers, promos, etc.) and information 515 associated with content, such as a selected content item in the content listing 525. The EPG 505 may include additional features known to those having ordinary skill in the art.

The content C1-C11 accessible through the EPG 505 may be associated with presentation settings PS1-PS11. In some embodiments, the presentation settings PS1-PS11 may be included in the metadata obtained by the service provider to populate the electronic programming guide. In some embodiments, a viewer may tune to or select content C1 and the content presentation device may be configured to recognize and read the data from the presentation settings PS1 attached to the program guide information. Responsive to receiving (and decoding as necessary) the presentation settings, the display of the content presentation device may be automatically re-configured according to the values listed in the presentation settings PS1. In some embodiments, the selection of content C1 through the EPG 505 may invoke a prompt requesting whether the user would like to implement the presentation settings PS1 (see, for example, prompt 620 of FIG. 6).

In some embodiments, the selection of content C1 through the EPG 505 may invoke a prompt requesting whether the user would like download or otherwise access the corresponding presentation settings PS1, for example, from a third party (e.g., the content creator, the service provider, the content presentation device manufacturer, etc.).

Figure 6:
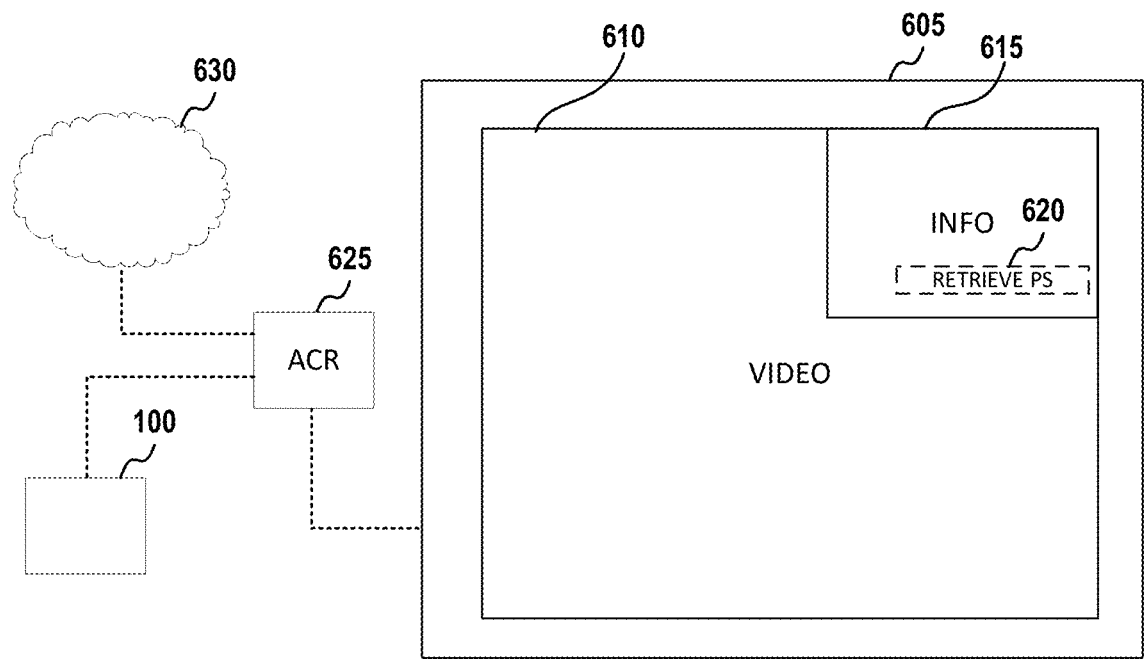
FIG. 6 depicts a presentation settings request interface for video content according to some embodiments.

FIG. 6 depicts a presentation settings request interface for video content according to some embodiments. As shown in FIG. 6, video content 610 may be presented through a content presentation device 605. In some embodiments, the provider presentation settings may be determined and/or modified automatically based on characteristics of the content asset and/or information associated with the content asset (e.g., provided by a service provider 115, content distributor 125a-n, and/or a third party), such as presentation settings or presentation information. In some embodiments, the provider presentation settings may be determined, modified, and/or accessed based on content recognition information, such as through automatic content recognition (ACR) processes. In some embodiments, a computing element 625 in operable communication with the content presentation device 605 may be configured to facilitate content recognition. In some embodiments, the computing element 625 may include software (e.g., a software application such as a mobile app, smart television application, or the like) and/or hardware (e.g., a processor and/or other circuitry configured to provide content recognition capabilities alone or in combination with software). In some embodiments, the computing element 625 may be integral to the content presentation device (e.g., hardware and software within a smart television, tablet computing device, etc.). In some embodiments, the computing element 625 may be integrated in a first computing device (e.g., a tablet computing device) in operable communication with the content presentation device 605. In some embodiments, components of the computing element 625 may be operable in a computing device and other components may be operable in the content presentation device (e.g., software on a tablet computing device configured to control and/or interface with hardware and/or software components of a content presentation device).

In some embodiments, the computing element 625 may be resident in the service provider 115, content provider 125a-n, a content presentation device 105a-n, 605, or some combination thereof. The computing element 625 may be in operable communication with a content distribution system 100 and/or components thereof (e.g., service provider 115, content provider 125a-n, a content presentation device 105a-n, and/or data stores 120). In some embodiments, the computing element 625 may be in operable communication with other networks 630, including a distributed computing network or cloud computing network or data storage system (the "cloud").

In some embodiments, information associated with the content asset (e.g., video content 610) may be obtained from a data source (e.g., from a data store 120 containing data concerning the content asset and/or similar content assets and/or the cloud 630) or determined based on analyzing the actual content asset. For example, the computing element 625 may be configured to receive and/or determine a water mark, footprint, signature, or other characteristic of the content asset being presented through a content presentation device (e.g., through ACR techniques), such as video content 610 being presented through content presentation device 605. In another instance, the content asset may be analyzed to determine certain characteristics that may relate to the recommended or optimal presentation settings, such as type of content asset (e.g., broadcast television video, web-based video, VOD video), subject or category (e.g., sports, movies, genres), presentation characteristics (e.g., light levels, sound levels, colors). In some embodiments, the provider presentation settings may be determined and/or modified based on the content recognition information.

In some embodiments, content recognition may be a dynamic process configured to automatically and dynamically change the presentation settings of a content presentation device based on the determined presentation characteristics of the content asset as it is being presented through the content presentation device. In some embodiments, the device information may include data and/or instructions for dynamically adjusting the device presentation settings over the duration of consumption of a content asset or due to content switching (e.g., different presentation information for a television program and different presentation information for intervening commercials). For example, the device presentation settings may have increased brightness for a darker scene in a movie and may have decreased brightness for a lighter scene in the movie. Accordingly, different content segments received by a content presentation device (such as program and commercial segments) may be associated with different presentation information.

A graphical user interface (GUI) element 615 (e.g., an overlay, a banner, pop-up, transparent window, etc.) may be presented on the screen of the content presentation device 605 with an option 620 to select the presentation settings associated with the content. For example, a viewer may initiate viewing of a movie through a television, such as a smart television, or a tablet computing device. The movie may be accessed through various sources described herein, include broadcast television, VOD, Blu-Ray™, etc. The computing element 625 may analyze the movie or otherwise access or receive information associated therewith in order to recognize the movie, content of the movie, or characteristics thereof. For instance, the computing element 625 may access a watermark, fingerprint, signature, or other data element encoded in or otherwise associated with the movie. Responsive to accessing the watermark, the computing element 625 may communicate with the cloud 630, a content distribution system 100, or components of a content distribution system 100 to identify the content and/or to obtain provider presentation settings relating thereto. The content presentation device 605 may receive the provider presentation settings and/or provide a prompt 620 to implement and/or download the provider presentation settings.

In some embodiments, the computing element 625 may transmit a request to the cloud 630, the content distribution system 100, or components of the content distribution system 100, that may include the identified content and/or address (e.g., IP or MAC address) or other identification information (e.g., provider subscriber identifier) for the content presentation device 605. In response, the relevant component of the cloud 630, the content distribution system 100, or components of the content distribution system 100 may transmit provider presentation settings to the content presentation device 605, for example, through the computing element 625 or communication components of the content presentation device 605. In this manner, a user may automatically access, implement, and/or receive provider presentation settings without having to actively search or intervene in the process.

In a non-limiting example, a user is watching a television program on a smart television through Hulu®. The television program has a watermark encoded in the transmission thereof. The watermark is detected by a software application operating on the smart television. The detection of the watermark triggers the software application to transmit a request to a provider presentation settings database operated through the content provider that produced the television program. The request may identify the television program and provide an IP address and television model information for the smart television. The provider presentation settings database receives the request and performs a lookup for the recommended presentation settings for the television program and particular television model (and/or type of television model, such as televisions of a particular range of sizes, brands, and other characteristics (e.g., HD, UHD, etc.)). The provider presentation settings database transmits presentation information associated with the recommended presentation settings to the smart television to the IP address. The smart television receives the presentation information and provides the user with a prompt to select to implement the provider presentation settings (alternatively, the user may provide a default setting to always implement the provider presentation settings without a prompt). The smart television, through a combination of software and hardware, implements the provider presentation settings responsive to user selection to adjust the presentation settings of the smart television.

In some embodiments, a user may be given the option to retrieve the optimal presentation settings from the content provider 125*a-n*, service provider 115, or other third party provider that may specialize in enhancing audio/visual settings (e.g., device manufacturer, third-party device settings entity).

In some embodiments, access to and/or the automatic configuration of presentation settings may be offered as a premium or fee-based service, for example, by a service provider 115, a content provider 125*a-c*, and/or a third-party. For instance, a cable or satellite provider, or internet subscription service, may offer the capability of the enhanced audio/visual settings for subscribers who choose to pay an additional fee.

While the embodiments described herein detail certain broadcast and transmission mechanisms, one skilled in the art would recognize that any means of media content transmission are fully within the scope of the invention. Further, while the embodiments described herein detail the use of the display device itself or set-top-boxes, one skilled in the art should recognize that the invention may be implemented using a variety of hardware and software that may reside internally to the content presentation device, externally or both.

Figure 7:
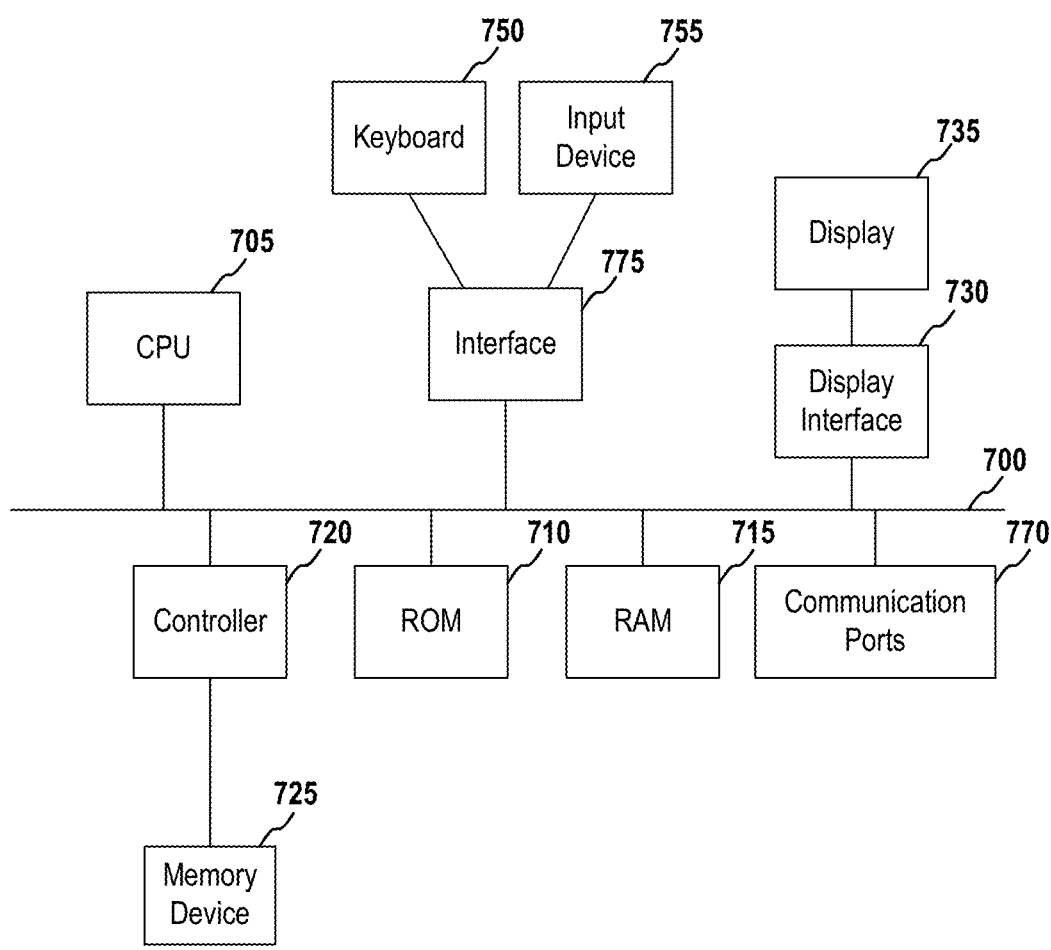
FIG. 7 illustrates various embodiments of a computing device for implementing the various methods and processes described herein.

FIG. 7 depicts a block diagram of exemplary internal hardware that may be used to contain or implement the various computer processes and systems as discussed above. A bus 700 serves as the main information highway interconnecting the other illustrated components of the hardware. CPU 705 is the central processing unit of the system, performing calculations and logic operations required to execute a program. CPU 705 is an exemplary processing device, computing device or processor as such terms are used within this disclosure. Read only memory (ROM) 730 and random access memory (RAM) 735 constitute exemplary memory devices.

A controller 720 interfaces with one or more optional memory devices 725 via the system bus 700. These memory devices 725 may include, for example, an external or internal DVD drive, a CD ROM drive, a hard drive, flash memory, a USB drive or the like. As indicated previously, these various drives and controllers are optional devices. Additionally, the memory devices 725 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determination, configuration, transmission, decoding, or the like of the presentation settings as described above may be stored in the ROM 730 and/or the RAM 735. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 730 can permit information from the bus 700 to be displayed on the display 735 in audio, visual, graphic or alphanumeric format. The information may include information related to a current job ticket and associated tasks. Communication with external devices may occur using various communication ports 740. An exemplary communication port 740 may be attached to a communications network, such as the Internet or a local area network.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system comprising:
a receiver configured to receive a message indicating selection of a content asset of a plurality of content assets for display on a content presentation device;
a transmitter configured to transmit, to a server, based on the indicated selection, a request for presentation settings associated with the content asset including a content presentation device type identifying model information of the content presentation device;
wherein the receiver is further configured to receive, from the server, at least one presentation setting comprising instructions for display and audio settings for playback of the content asset using the content presentation device type; and
a processor in the content presentation device configured to:

adjust at least one presentation setting of the content presentation device based on the at least one presentation setting, determine at least one presentation characteristic of the content asset during playback of the content asset on the content presentation device, and adjust, during playback of the content asset on the content presentation device, the at least one presentation setting to correspond with the at least one presentation characteristic.

2. The system of claim 1, wherein the at least one presentation setting is associated with a presentation mode for a type of content associated with the content asset.

3. The system of claim 1, wherein recommended presentation settings are displayed via a program guide.

4. The system of claim 1, wherein the information identifying the content presentation device type comprises model information associated with at least one of a television, a set-top-box, a tablet computing device, or a smartphone.

5. The system of claim 1, wherein the content asset comprises at least one of broadcast video, video-on-demand (VOD), and satellite radio.

6. The system of claim 1, wherein the adjusting at least one presentation setting of the content presentation device is further based on content recognition information determined using automatic content recognition.

7. The system of claim 1, wherein the at least one presentation setting comprises at least one of treble, bass, contrast, sharpness, brightness, display mode, resolution, aspect ratio, or scaling.

8. A method comprising:

receiving a message indicating selection of a content asset of a plurality of content assets for display on a content presentation device;

transmitting, to a server, based on the indicated selection, a request for presentation settings associated with the content asset including a content presentation device type identifying model information of the content presentation device;

receiving, from the server, at least one presentation setting comprising instructions for display and audio settings for playback of the content asset using the content presentation device type;

adjusting at least one presentation setting of the content presentation device based on the at least one presentation setting;

determining by the content presentation device at least one presentation characteristic of the content asset during playback of the content asset on the content presentation device; and adjusting, during playback of the content asset on the content presentation device, the at least one presentation setting to correspond with the at least one presentation characteristic.

9. The method of claim 8, wherein the at least one presentation setting is associated with a mode for a type of content associated with the content asset.

10. The method of claim 8, wherein recommended presentation settings are displayed via a program guide.

11. The method of claim 8, wherein the information identifying the content presentation device type comprises model information associated with at least one of a television, a set-top-box, a tablet computing device, or a smartphone.

12. The method of claim 8, wherein the content asset comprises at least one of broadcast video, video-on-demand (VOD), and satellite radio.

13. The method of claim 8, wherein the adjusting at least one presentation setting of the content presentation device is further based on content recognition information determined using automatic content recognition.

14. The method of claim 8, wherein the at least one presentation setting comprises at least one of treble, bass, contrast, sharpness, brightness, display mode, resolution, aspect ratio, or scaling.

15. A device comprising:

one or more processors; and memory storing instructions that, when executed by the one or more processors, cause the device to:

receive a message indicating selection of a content asset of a plurality of content assets for display on the computing device;

transmit, to a server, based on the indicated selection, a request for presentation settings associated with the content asset including a computing device type identifying model information of the computing device;

receive, from the server, at least one presentation setting comprising instructions for display and audio settings for playback of the content asset using the computing device type; and adjust at least one presentation setting of the computing device based on the at least one presentation setting, determine from the content presentation device at least one presentation characteristic of the content asset during playback of the content asset on the computing device, and adjust, during playback of the content asset on the computing device, the at least one presentation setting to correspond with the at least one presentation characteristic.

16. The device of claim 15, wherein the information identifying the computing device type comprises model information associated with is at least one of a television, a tablet computing device, or a smartphone.

17. The device of claim 15, further comprising a decoder in operable communication with the processor, the decoder being configured to decode the presentation setting.

18. The device of claim 15, wherein the at least one presentation setting comprises at least one of treble, bass, contrast, sharpness, brightness, display mode, resolution, aspect ratio, or scaling.

19. The system of claim 4, wherein the model information indicates a brand, a resolution, scaling, an aspect ratio, a high definition characteristic, or a size.

20. The system of claim 1, wherein the information identifying the content presentation device type comprises an Internet Protocol (IP) address.

21. The system of claim 1, wherein the transmitting is triggered based on detection of a watermark encoded in the content asset.

22. The method of claim 11, wherein the model information indicates a brand, a resolution, scaling, an aspect ratio, a high definition characteristic, or a size.

23. The method of claim 8, wherein the information identifying the content presentation device type comprises an Internet Protocol (IP) address.

24. The method of claim 8, wherein the transmitting is triggered based on detection of a watermark encoded in the content asset.

25. The device of claim 15, wherein the information identifying the content presentation device type comprises an Internet Protocol (IP) address.

26. The device of claim 15, wherein the transmitting is triggered based on detection of a watermark encoded in the content asset.

* * * * *